Figure 1:
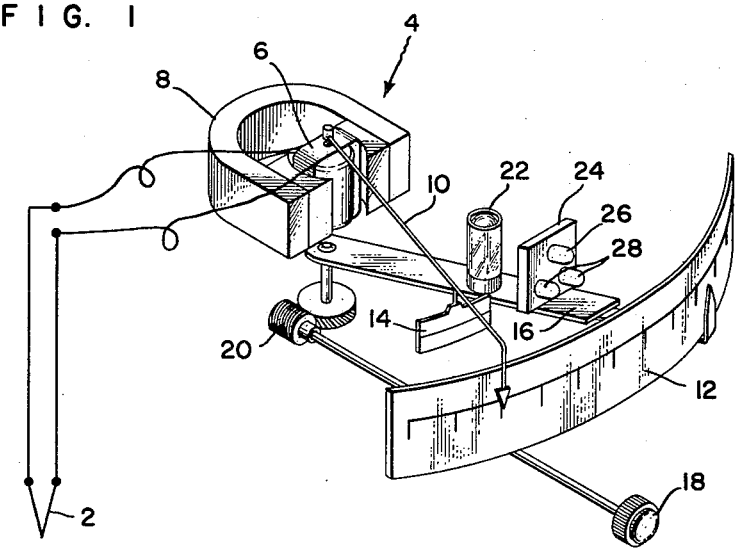

June 1, 1965  A. V. MARTIN  3,187,186
ELECTRICAL MEASURING APPARATUS WITH AUTOMATIC
INTEGRATING ACTION
Filed Jan. 12, 1962  2 Sheets-Sheet 1

INVENTOR.
ALBERT V. MARTIN
BY Arthur H. Swanson
ATTORNEY.

INVENTOR.
ALBERT V. MARTIN
BY Arthur H. Swenson
ATTORNEY.

United States Patent Office 3,187,186
Patented June 1, 1965

3,187,186
ELECTRICAL MEASURING APPARATUS WITH AUTOMATIC INTEGRATING ACTION
Albert V. Martin, Willowick, Ohio, assignor to Honeywell Inc., a corporation of Delaware
Filed Jan. 12, 1962, Ser. No. 165,763
10 Claims. (Cl. 250—231)

This invention relates to electrical apparatus, and more particularly to an improved electrical measuring and controlling instrument.

In the art of industrial process controls, there have been provided instruments which respond to signals derived from measured process variables to cause an indicating arm to rotate about a fixed pivot or axis. The arm carries at its outer extremity a pointer which moves along and cooperates with a scale to give an indication of the level or condition of the measured variable. Further, means have been provided for responding to the movement of that arm to a predetermined value, or set point, on the scale to provide a control signal for controlling some phase of the process under measurement. This means has included the combination of a light source and photocell positioned such that an opaque vane carried by the pointer arm interrupts at least a part of the light between the source and the photocell to produce an output signal when the arm and the vane have moved into the position corresponding to the predetermined position. By contouring one edge of the interrupting vane, means have been provided for obtaining a variable signal which varies by an amount substantially proportional, over a limited range, to the position of the indicating arm within that range. The output signal thus derived is fed to a suitable amplifier, such as a magnetic amplifier, thence to control means for controlling the process. Under predetermined conditions, such instrumentalities are effective to bring the process up to and maintain it at the desired control level. However, should the predetermined conditions be varied, the set point condition does not produce a proper signal for maintaining the process at the desired level. This introduces an error known in the art as "droop". In more elaborate or sophisticated control systems, such errors have been overcome with a signal known as "reset" which is automatically developed in the circuit configuration thereof. However, such automatic reset signals have not been heretofore provided in such simple control instruments as that hereinbefore described.

It is accordingly, an object of the present invention to provide a deflecting vane type controller featuring improved control action.

It is another object of this invention to provide a deflecting vane controller characterized by improved proportional action.

It is still another object of this invention to provide a deflecting vane controller which features automatic reset action.

It is yet another object of this invention to provide an improved deflecting vane type controller which features an improved proportioning action and is characterized by the addition of automatic reset action without the addition of mechanical or electrical detent to the deflecting member.

In accomplishing these and other objects, there has been provided, in accordance with the present invention, a deflecting vane controller wherein an indicator arm is caused to move about its axis along a scale in accordance with a measured variable. A second arm is manually movable, about the same axis as the indicator arm, along the same scale and comprises a set point selecting and indicating means. The second arm carries, first, means providing a light source, and, second, a photocell mounting means carrying three prepositioned photocells. The indicator arm carries a novel vane which, when the indicator arm approaches the set point value, comes between the light source and the photocells selectively controlling the amount of light falling from the light source onto the photocells in accordance with the position of the indicator arm, hence of the vane. The vane material is basically transparent to the light but is provided with means rendering the vane partially or completely opaque in accordance with a predetermined pattern constituting a variable density light vane. One of the three photocells carried by the second arm comprises the main control element of the controller and cooperates with a portion of the vane which is transparent at one end and completely opaque at the other end with a progressive gradation of opacity between the two extremities. The other two photocells comprise means for deriving a reset signal and are positioned side by side in the direction of travel of the vane. These two photocells cooperate with a portion of the vane which is transparent at both ends with a portion of maximum opacity at the center and uniformly decreasing density from the center towards the end. The portion of the variable density transparent vane cooperating with the single photocell comprises means for developing a first intermediate control signal which is used for obtaining an improved proportional signal over a substantially longer portion of the scale. The arrangement of the two photocells, in cooperation with the other portion of the vane, for obtaining the reset signal comprises means for deriving a second intermediate control signal which is proportional to the deviation of the vane from its set point value. That deviation signal is applied to a suitable circuit for obtaining a signal which is a function of the time duration of that unbalanced signal. That signal is then applied to the controller in such direction as to provide the desired reset action.

Figure 2:
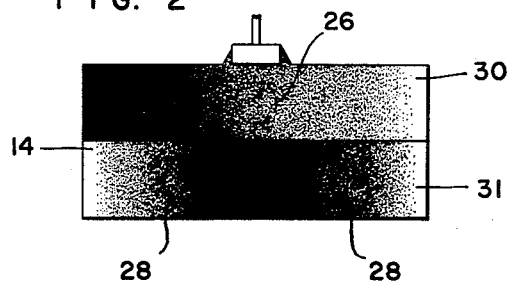
Figure 3:
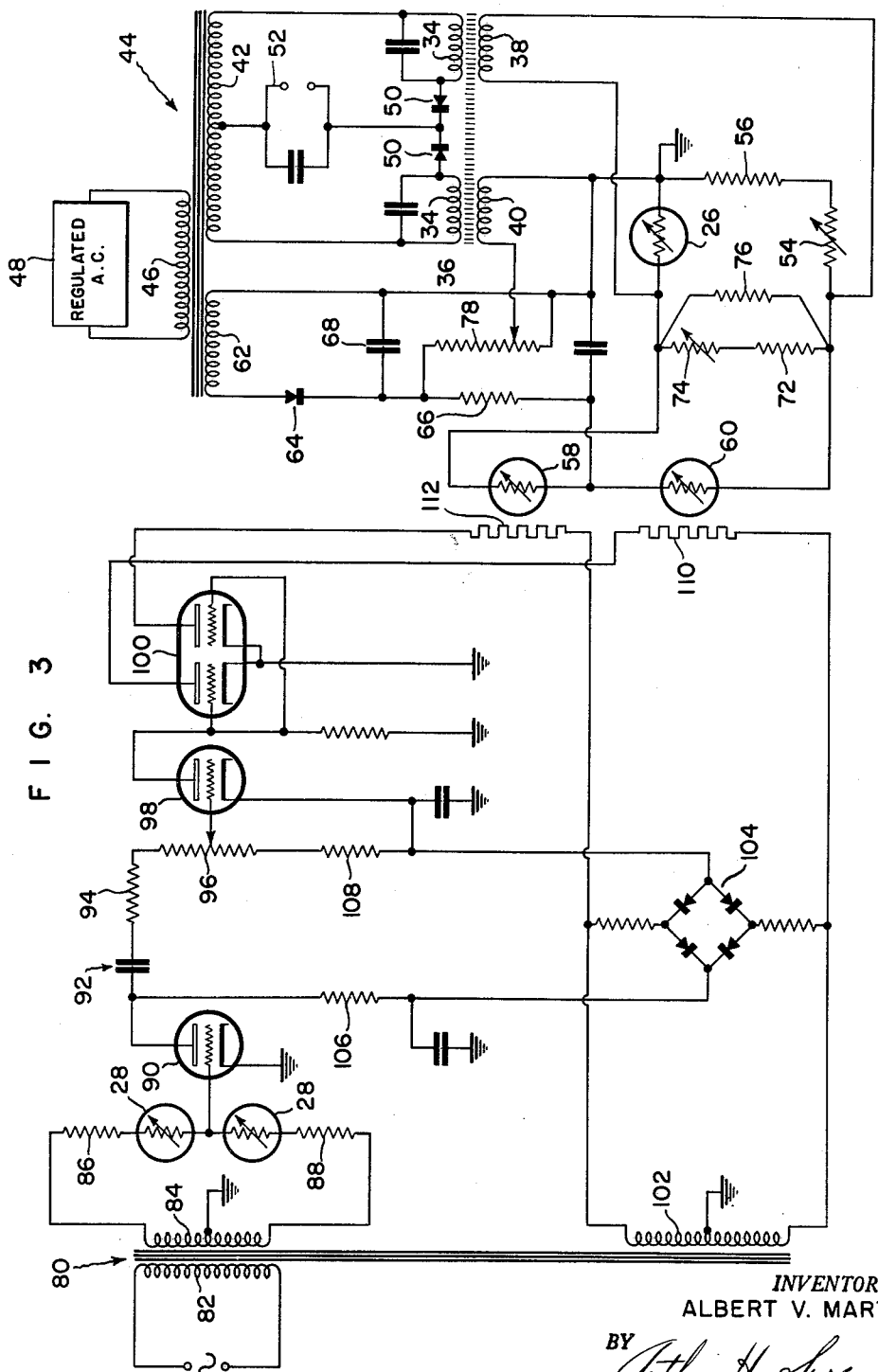

A better understanding of this invention may be had from the following detailed description when read in connection with the accompanying drawings, in which:

FIG. 1 is a skeleton view partly schematic and partly perspective of an instrument embodying the present invention, FIG. 2 is a detailed elevational view of a vane suitable for use in the practice of the present invention, and FIG. 3 is a schematic circuit diagram of an instrument embodying the present invention.

Referring now to the drawing in more detail, there is shown, in FIG. 1, a measuring and controlling instrument which comprises a condition sensing transducer here represented as a thermocouple 2. A deflecting vane measuring and controlling instrumentality is here represented as an electrical moving coil galvanometer type device 4. The electrical leads of the thermocouple 2 are connected to the moving coil 6 of the galavanometer 4. The coil 6 is pivotally mounted for limited rotation in the field of a permanent magnet 8. Securely mounted on the shaft of the moving coil 6 is an indicator arm 10. The outer extremity of the indicator arm 10 terminates in an indicator pointer which moves across a calibrated scale 12 to give an indication of the condition sensed by the thermocouple 2. At an intermediate point along the length of the arm 10 there is positioned a vane 14. Coaxially mounted with respect to the indicator arm 10 there is mounted a second arm 16 which may be referred as the set point arm. The outer extremity of the set point arm 16 also carries a pointer which moves across the scale 12. This arm 16 is movable by means of a knob 18 and gear train 20 to position the pointer along the scale at a position representative of the desired control value.

The arm 16 carries, at a point intermediate its ends, first, a light source means 22, and, second, a mounting means 24 for a plurality of photocells. The mounting means 24 is arranged to support a first photocell 26 and a pair of photocells 28 in spaced array and in position to normally receive light from the light source means 22. The vane 14 carried by the arm 10 is shown in more detail in FIG. 2. There it may be seen that the vane 14, while it may be a single integral part, provides two distinct areas of differently characterized light transmitting properties. The first of these areas 30 is shown as occupying the upper half of the vane 14. This area is positioned to cooperate with the first photocell 26 and constitutes a progressive light valve for the photocell. In accomplishing this function, the vane is made of a basically transparent material such as a suitable plastic. An example of a suitable material for the vane is a polyester film manufactured by E. I. du Pont under the name of Mylar. The right end of the area 30, as viewed in FIG. 2 of the drawing, is maintained in a clear condition. Means are provided for rendering the area 30 gradually and progressively more dense or opaque as the opposite end of the area 30 is approached. This provides a continuously variable, variable density light gate for controlling the amount of illumination falling upon the photocell 26.

The second area 31 of the vane 14 is illustrated as occupying the lower half of the vane 14 in FIG. 2. This portion is arranged to cooperate with the pair of photocells 28. This portion of the vane, too, is formed of the basically transparent material. This portion differs from the upper or first area of the vane 14 in that both ends of the area are maintained in a clear condition with means providing gradually and progressively increasing density or opacity towards the center of the area. With this arrangement, if the vane is centered between the two photocells comprising the pair of photocells 28 then both photocells receive the same amount of illumination. However, if the vane is not centered between the two photocells then one of these two photocells receives more light than the other. This is a characteristic which will be discussed in more detail hereinafter.

Since the signals providing the deflection of the arm 10 are small, the force on the arm is small. Consequently, position sensing means which add either mechanical or electrical detent to the arm cannot be tolerated. The variable density cooperating with the photocells imposes no such detent.

In FIG. 3 there is shown an electronic circuit which is suitable for use in connection with the foregoing apparatus to provide the desired control action. In FIG. 3 the control circuit is illustrated as including a magnetic amplifier 32 having a pair of gate windings 34, a saturable core 36, a control winding 38, and a bias winding 40. The gate windings 34 are energized from the secondary winding 42 of a transformer 44, the primary winding 46 of which is energized from a regulated A.C. source 48. A pair of oppositely poled diodes 50 are serially connected between adjacent ends of the two gate windings 34 of the magnetic amplifier 32. An output circuit is connected between the junction intermediate the two diodes 50 and a center tap on the secondary winding 42 of the transformer 44.

The magnetic amplifier 32 is controlled by signals applied to the control winding 38 from a signal bridge. The photocell 26 comprises one arm of the signal bridge, an adjacent arm of the bridge is formed of a variable resistor 54 and a fixed resistor 56. The other two arms of the bridge are formed by a pair of thermistors 58 and 60. The bridge is energized from a power supply means which includes a further secondary winding 62 on the transformer 44, a rectifying diode 64 and a pi filter including a resistor 66 and two capacitors 68 and 70 supplying D.C. energy to a pair of diametrically opposed corners of the bridge. The other two corners of the bridge are connected directly to the control winding 38 of the magnetic amplifier 32. A sensitivity adjusting resistance network is connected across the same two corners of the bridge as is the control winding. The sensitivity adjust network includes a first fixed resistor 72 connected in series with a variable resistor 74. Connected in shunt with these two resistors is another fixed resistor 76.

A low voltage direct current bias signal for energizing the bias winding 40 on a magnetic amplifier 32 is obtained from a voltage dividing slidewire 78 connected across the leads of the power supply circuit. This signal is used to bias the magnetic amplifier into the desired operating range.

The elements of the bridge are so arranged that the bridge is balanced when the process under control is operating at the desired set point value. Deviations of the vane from this controlled value causes an unbalanced condition in the bridge which applies an appropriate control signal to the control winding 38 of the magnetic amplifier 32. This in turn produces an output signal at the output terminal 52 in such a direction to cause the process condition to change toward that constituting the desired range.

In order to accomplish the desired control action involving the thermistors 58 and 60, there has been provided a special control circuit responsive to the operation of the two photocells 28 previously mentioned. This circuit includes a power transformer 80 having a primary winding 82 connected to a suitable A.C. source. A first secondary winding 84 which may be a filament winding on the power transformer is provided with a center tap. The extreme ends of the winding 84 are serially connected to a first limiting resistor 86, one of the photocells 28, the other of the photocells 28 and a second limiting resistor 88. A junction between the two photocells 28 is directly connected to the control grid of a first amplifier tube 90. The output of the tube 90 is connected through a coupling capacitor 92, a coupling resistor 94 and a slidewire resistor 96 to the input of a second amplifier tube 98. The output of the tube 98 is directly connected simultaneously to both input control grids of a dual triode amplifier 100 constituting a first and a second output stage. In these final stages both cathodes of the dual triode 100 are connected together and grounded. A power supply for these amplifier stages is obtained by an additional secondary winding 102 on the transformer 80. In the case of the tube 90 and 98 the power is derived from the output windings of the secondary 102 through a rectifier bridge 104 connected thereacross thence through a load resistor 106, in the case of the tube 90, and a blocking resistor 108 in the case of the tube 98. In the case of the output stages 100, it may be seen that one of the anodes of the tube 100 is conencted through a heater resistor 110 to one of the extreme terminals of the secondary winding 102 while the other anode of the dual triode is connected through another heater resistor 112 to the opposite extreme end of the secondary winding 102. It should be noted that the secondary winding 102 on the transformer 80 has a grounded center tap.

Assuming, for example, that temperature is the process condition upon which the control action is exercised, the condition sensor may be represented by the thermocouple 2. The thermocouple produces an electrical signal which is representative of the temperature to which it is exposed. This electrical signal is applied to the indicating instrument here shown as a galvanometer 4. The signal in the moving coil 6 of the galvanometer 4 causes the indicator arm 10 to move to a position along the scale indicative of the magnitude of the signal in the coil, hence of the temperature sensed by the thermocouple 2.

The set point arm 16 will have been positioned to establish the desired set point or control temperature. While the measured temperature is still substantially below the set point value, the vane 14 will not be interposed between the light source 22 and the photocells 26 and 28. Under these conditions, the photocells receive full illumination. Of course, the photocells 28 receive equal light, hence, there is no disturbance to the bridge circuit of the control circuit due to their influence. However, as was briefly mentioned before, the bridge is arranged to be in balance when the process is operating at the desired set point condition. At that condition, the pointer of the indicator arm 10 is aligned with the pointer of the set point arm 16, and the vane 14 is centered between the light source 22 and the photocells. Thus positioned, the photocell 26 would receive an amount of light which is about half as intense as the full illumination. Therefore, when the photocell 26 is receiving full illumination, the bridge is unbalanced in a direction to cause the magnetic amplifier 32 to produce a maximum output signal of such polarity as will cause the controlled temperature to increase. As the temperature increases and the pointer on the arm 10 moves up scale, the vane 14 enters the space between the light source 22 and the photocells. When this occurs, the light falling on the photocell 26 is diminished, reducing the output of the magnetic amplifier 32. As the temperature continues to increase, the vane 14 continues to move in the upscale direction, progressively reducing the amount of light falling on the photocell 26 due to the progressively increasing density of the opacity of the portion 30 of the vane 14. This action, of course, progressively decreases the output signal from the magnetic amplifier 32. This trend continues until the vane 14 has reached the center position, when the bridge is balanced and the output of the magnetic amplifier has been reduced to that value necessary to maintain the process at the control point condition.

If, for some reason, one of the basic parameters of the process is changed, such, for example, as the size of the load under process or the B.t.u. rating of the fuel supplying the heat, then the pointer on the indicator arm 10 will no longer line out with the pointer on the set point arm. This would be apparent from a realization that the balanced condition of the bridge produces a predetermined output signal which is translated by the controlled system, in the case of fuel being supplied to a furnace, as a predetermined valve opening for the admittance of fuel. If the parameters change, then a different amount of fuel is necessary to accomplish the same job. Thus, for example, if the load is increased or the B.t.u. rating of the fuel is decreased, a higher rate of flow of the fuel is necessary to bring the process up to and maintain it at the required temperature. In order to produce the required additional current to provide the increased opening of the valve in the fuel line, the bridge must be unbalanced. In the absence of a reset signal, the arm 10, and the process condition represented thereby would settle out at some compromise position short of the set point value. Conversely, if the load is diminished or the B.t.u. rating of the fuel is increased, the system would settle out at some value above the set point value.

A signal necessary to correct such an undesired off-set should be one characterized in that it starts at a zero value correction, and progressively increases in proportion to both the magnitude of the off-set and the time duration of such off-set. Such a signal is provided in this instance by the circuitry associated with the pair of photocells 28.

Continuing with the illustrative example, let it be assumed that the process parameters have changed in a direction to cause the system to settle out at a value lower than the set-point value. The area 31 of the vane 14 will produce an unequal illumination of the two photocells 28. The unequal illumination of the photocells produces a pulsating signal at the electrical junction between the two photocells 28 as shown in FIG. 3. These signals will correspond to one phase or the other of the A.C. excitation, depending upon which of the photocells 28 is of lower resistance due to the unequal illumination. This pulsating signal is amplified by the two amplifier stages 90 and 98, then applied simultaneously to the control electrodes of the two output stages represented by the dual triode output tube 100. The two anodes are connected, respectively, to opposite end terminals of the secondary winding 102 on the transformer 80. A center tap on the secondary winding 102 is grounded, as are the two cathodes of the tube 100. There is thus provided two alternate conductive paths for current developed in the winding 102. One path includes the upper terminal of the winding, the heater resistor 112, the right half of the dual triode to ground, and through ground back to the center tap on the winding 102. The other path includes the lower terminal of the winding 102, the heater resistor 110, the left half of the dual triode to ground, and through ground back to the center tap of the winding 102. Thus the anodes of the two output stages are alternately biased positively and negatively and are oppositely phased.

With the amplified pulsating signals applied simultaneously to the control grid of both of the output stages, the pulsations will be in phase with the signals on only one of the anodes of the tube 100. That phase relationship will be determined by which one of the two photocells 28 is receiving the greater illumination. Assume, for example, that the lower of the two photocells, as shown in FIG. 3, is the one receiving more light. Then the pulsating signals produced at the input electrode of the amplifier stage 90 will be in phase with the signal developed at the lower terminal of the winding 84. Similarly, the output of the second stage amplifier 98 is also in phase with the signal developed at the lower end of the winding 84. This signal is applied to both control electrodes of the dual output stage 100. While both control grids will be raised in potential at the same time and in accordance with the amplified pulsating signals, conduction will occur in only one of the two output stages, that one in which the positive pulsations of the input signal are in phase with the positive half cycles of the energization applied to the anodes. In the illustration, it may be assumed that conduction occurs in the first output stage, or left member of the tube 100, during the positive half-cycles of the anode supply. No conduction will occur in the second output stage since the positive pulses on the control grid will be 180° out of phase with the positive half cycles of the anode supply applied thereto.

With conduction through the first output stage, current will flow through the heater resistor 110. Heat thus generated, changes the temperature of the thermistor 60, reducing the impedance thereof. That produces, in turn, an unbalance condition in the bridge in such a direction as to increase the output signal of the magnetic amplifier 32. The increased signal from the magnetic amplifier results in an increase in the flow of fuel to the furnace, raising the temperature of the process. As the temperature of the process is increased, the arm 10 carrying the vane 14 moves up scale toward the set point condition. So long as the vane is not centered between the two photocells 28, there will be an unbalanced signal produced. Thus, there is but one position for the system to settle-out on, the set point position.

If, on the other hand, the situation is reversed and the system tends to settle out at a temperature above set-point, then the upper photocell 28 of the two shown in FIG. 3 will receive the more light and the pulsating signals will be of opposite phase from those previously discussed. Under this condition, current will flow in that circuit including the second output stage of the tube 100. This causes the heater 112 to increase the temperature of the thermistor 58, unbalancing the bridge in the opposite direction, causing the output of the magnetic amplifier to decrease, reducing the temperature of the process to that called for by the set point.

It may be seen that the amplitude of the heating current through either of the heating resistors 110 or 112, will be proportional to the difference in illumination on the two photocells 28, respectively. This, of course is proportional to the deviation of the vane 14 from its center position representing the set point condition. The magnitude of the current through either of the heater resistors determines the effective heating thereof.

The thermistors 58 and 60 are constructed to include means providing a predetermined thermal inertia. This thermal inertia has two effects. First, it minimizes the influence of the reset circuitry when the process responds normally without the need for the reset signal. Second, it provides the desired time-integral function for the reset circuit. Whereas the heater members may respond to the unbalance signal fairly rapidly, the heat transferred to the thermistors is proportional both to the temperature of the heaters and the time duration of the application of that heat. That is, for a given temperature of either of the heaters 110, 112, the longer the heat is applied, the hotter the thermistor will get, up to predetermined limits. The heat will be continuously applied so long as the area 31 of the vane 14 is not centered between the two photocells 28.

Thus there has been provided means for developing a reset signal which is proportional both to the magnitude of a process variable from a set-point value and to the time-integral of such deviation.

Within the limits of the system, the time constant of the reset action may be controlled between a maximum and a minimum rate by operation of the gain control slidewire 96. Further, if the slider of the slidewire 96 is moved to its minimum gain position, the automatic reset action is rendered non-effective. Under this condition a manual reset control may be effected by operation of the variable resistor 54 in the control bridge.

While this invention has been described in relation to an electric signal producing primary sensor and a moving coil galvanometric instrument. It should be appreciated that the principle of this invention is equally applicable to control systems employing other types of sensors and other types of indicating instruments. For example, a pressure sensitive sensor may be used to transmit a pressure signal to an instrument having a bourdon type movement. Such instruments also provide a moving arm carrying a deflecting vane as in the illustrative galvanometric instrument.

Thus it may be seen that there has been provided an improved deflecting type controller which features improved proportioning action and automatic reset.

What is claimed is:

1. In a process control system, a control instrument comprising a galvanometric meter movement having an indicator arm movable about an axis in response to electrical signals representative of a process condition, a set-point arm selectively movable about said axis to a preselected position representative of a predetermined range of values about a set-point value for said process condition, photoelectric means mounted on said set-point arm, said photoelectric means including a light source means, a first photocell for producing a first intermediate control signal and a pair of photocells for producing a second intermediate control signal, a vane member mounted on said indicator arm in a position on said indicator arm to be carried thereby between said light source and said photocells, said vane being made of a basically transparent material and having a first transverse area characterized in progressive gradation from maximum transparency at one end thereof to maximum opacity at the other end, said vane having a second transverse area characterized in a progressive gradation from a maximum opacity at the center of said second transverse area to a maximum transparency at both ends thereof, said first area being oriented for cooperation with said first photocell to produce said first intermediate control signal representative of the position of said indicator arm within said range, said second area being oriented for cooperation with said pair of photocells for producing said second intermediate control signal representative of the deviation of said indicator arm from the center of said range, a phase sensitive amplifier having output means including a first and a second heater resistor, said amplifier being responsive to said second intermediate control signal to effect heating of one or the other of said heater resistors depending upon the magnitude and direction of said deviation of said indicator arm from the center of said range, a bridge circuit including said first photocell as one leg thereof and a pair of temperature sensitive resistors as two other legs thereof, each of said two temperature sensitive resistors being positioned to be heated by an associated one of said heater resistors, respectively, and an output control means for producing an output control signal, said output control means including a magnetic amplifier connected to be controlled by the balance condition of said bridge circuit, said balance condition of said bridge circuit being responsive to said first intermediate control signal and to the relative heating of said temperature sensitive resistors.

2. The invention as set forth in claim 1 wherein said transparent material of said vane is Mylar.

3. In a process control system, a control instrument comprising a first arm movable about an axis in response to signals representative of a proces condition, a second arm selectively movable about said axis to a preselected position representative of a predetermined value of said process condition, means carried by said second arm for producing a first and a second intermediate control signal, means carried by said first arm for modifying said first intermediate control signal in accordance with the position of said first arm relative to said second arm and for modifying said second intermediate control signal in accordance with the deviation of said first arm from alignment with said second arm, integrating means responsive to said second intermediate control signal for producing a deviation time-integral signal, output control means for producing an output control signal for controlling the operation of the process under control, and means responsive to said first intermediate control signal and said deviation time-integral signal for controlling the operation of said output control means in accordance with the operation of said first arm relative to the position of said second arm.

4. In a process control system, a control instrument comprising a first arm movable about an axis in response to signals representative of a process condition, a second arm selectively movable about said axis to a preselected position representative of a predetermined range of values of said process condition, photoelectric means carried by said second arm for producing a first and a second intermediate control signal, a variable density vane carried by said first arm for modifying said first intermediate control signal in accordance with the position of said first arm in said range and for modifying said second intermediate control signal in accordance with the deviation of said first arm from the center of said range, integrating means responsive to said second intermediate control signal for producing a deviation time-integral signal, output control means for producing an output control signal for controlling the operation of the process under control, and means responsive to said first intermediate control signal and said deviation time-integral signal for controlling the operation of said output control means in accordance with the operation of said first arm in said range.

5. In a process control system a control instrument comprising a first arm movable about an axis in response to signals representative of a process condition, a second arm selectively movable about said axis to a preselected position representative of a predetermined range of values of said process condition, photoelectric means carried by said second arm, said photoelectric means including a light source means, a first photocell for producing a first intermediate control signal and a pair of photocells for producing a second intermediate control signal, a vane carried by said first arm for cooperative association with said photoelectric means to produce said intermediate control signals, said vane including a first transverse area of progressively increasing opacity varying in density from maximum transparency at one end to maximum opacity at the other end, said first area of said vane being oriented for cooperation with said first photocell to produce said first intermediate control signal in accordance with the position of said first arm in said range, said vane having a second transverse area of progressively increasing opacity varying in density from maximum transparency at both ends to maximum opacity at the center of said second transverse area, said second area of said vane being oriented for cooperation with said pair of photocells to produce said second intermediate control signal in accordance with the deviation of said first arm from the center of said range, integrating means responsive to said second intermediate control signal for producing a deviation time integral signal, output control means for producing an output control signal for controlling the operation of the process under control, and means responsive to said first intermediate control signal and said deviation time-integral signal for controlling the operation of said output control means in accordance with the operation of said first arm in said range.

6. In a process control system, a control instrument comprising a first arm movable about an axis in response to signals representative of a process condition, a second arm selectively movable about said axis to a preselected position representative of a predetermined range of values of said process condition, photoelectric means carried by said second arm, said photoelectric means including a light source means, a first photocell for producing a first intermediate control signal and a pair of photocells for producing a second intermediate control signal, a vane carried by said first arm for cooperative association with said photoelectric means to produce said intermediate control signals, said vane including a first transverse area of progressively increasing opacity varying in density from maximum transparency at one end to maximum opacity at the other end, said first area of said vane being oriented for cooperation with said first photocell to produce said first intermediate control signal in accordance with the position of said first arm in said range, said vane having a second transverse area of progressively increasing opacity varying in density from maximum transparency at both ends to maximum opacity at the center of said second transverse area, said second area of said vane being oriented for cooperation with said pair of photocells to produce said second intermediate control signal in accordance with the magnitude of the deviation of said first arm from the center of said range, integrating means responsive to said second intermediate control signal to produce a deviation time-integral signal, output control means for producing an output control signal for controlling the process under control, and bridge means including said first photocell responsive to said first intermediate control signal and said deviation time-integral signal for controlling the operation of said output control means in accordance with the operation of said first arm in said range.

7. The invention as set forth in claim 5 wherein said output control means comprises a magnetic amplifier.

8. In a process control system, a control instrument comprising a deflecting member, means responsive to signals representative of a process condition for effecting deflection of said deflecting member proportionately with the magnitude of the process condition signals, means operable upon deflection of said deflecting member into a predetermined range to produce a first intermediate control signal representative of the position of said deflecting member in said predetermined range, means operable upon deflection of said deflecting member into said predetermined range to produce a second intermediate control signal representative of the deviation of said deflecting member from the center of said range, integrating means responsive to said second intermediate control signal for producing a deviation time-integral signal, output control means for producing an output control signal for controlling the operation of the process under control, and means responsive to said first intermediate control signal and said time-integral signal for controlling said output control means in accordance with the operation of said deflecting member.

9. In a process control system, a control instrument comprising a first arm movable about an axis in response to signals representative of a process condition, a second arm selectively movable about said axis to a preselected position representative of a predetermined range of values of said process condition, photoelectric means carried by said second arm, said photoelectric means including a light source means, a first photocell for producing a first intermediate control signal and a pair of photocells for producing a second intermediate control signal, a vane carried by said first arm for cooperative association with said photoelectric means to produce said intermediate control signals, said vane being characterized in varying degrees of density from a maximum opacity to a maximum transparency, said vane including a first transverse area having a density progressively varied from one of said maxima at one end to the opposite maxima at the other end, said first area of said vane being oriented for cooperation with said first photocell to produce said first intermediate control signal in accordance with the position of said first arm in said range, said vane including a second transverse area having a density progressively varied from one of said maxima at the center of said area to the opposite one of said maxima of both ends thereof, said second area of said vane being oriented for cooperation with said pair of photocells to produce said second intermediate control signal in accordance with the deviation of said first arm from the center of said range, integrating means responsive to said second intermediate control signal for producing a deviation time integral signal, output control means for producing an output control signal for controlling the operation of the process under control, and means responsive to said first intermediate control signal and said deviation time-integral signal for controlling the operation of said output control means in accordance with the operation of said first arm in said range.

10. A process control instrument comprising a first arm movable about an axis in response to applied signals, a second arm selectively movable about said axis to a preselected position representative of a predetermined value of said applied signals, photoelectric means carried by said second arm, said photoelectric means including a light source means and a pair of photocells positioned in side-by-side relationship, and a vane carried by said first arm, said vane being characterized in varying degrees of density from a maximum opacity to a maximum transparency, said vane including a transverse area having one of said maxima at the center thereof and progressive gradations to the opposite maxima at both ends, said area of said vane positioned on said first arm for cooperative association with said pair of photocells to produce an output signal representative of the deviation of said first arm from said predetermined value.

References Cited by the Examiner

UNITED STATES PATENTS

| | | | |
|---|---|---|---|
| 2,182,696 | 12/39 | Janeway | 250—231 X |
| 2,236,255 | 3/41 | Young | 250—231 |
| 2,700,318 | 1/55 | Snyder | 250—203 X |
| 2,858,449 | 10/58 | Burr | 250—83.6 |
| 2,944,190 | 7/60 | Ost | 250—237 X |
| 2,975,295 | 3/61 | Peter | 250—237 |
| 2,979,628 | 4/61 | Goan | 250—231 X |
| 3,028,503 | 4/62 | Stevenson | 250—231 |
| 3,053,988 | 9/62 | Street | 250—231 |
| 3,082,328 | 3/63 | Mohring | 250—231 |
| 3,118,087 | 1/64 | Eisenberg | 250—213 X |

RALPH G. NILSON, *Primary Examiner.*